Figure 1:
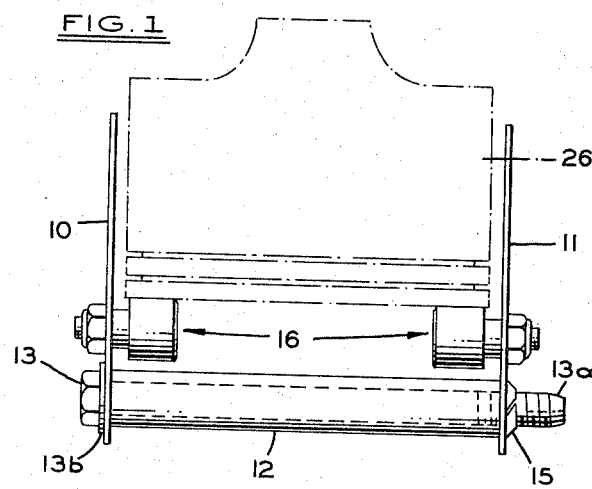

May 30, 1967  H. G. WHITFIELD  3,322,251

FLEXIBLE GRAVITY CONVEYOR

Filed April 19, 1965

INVENTOR.
HOMER G. WHITFIELD
BY Farley, Forster
and Farley
ATTORNEYS 3,322,251
FLEXIBLE GRAVITY CONVEYOR
Homer G. Whitfield, Northville, Mich., assignor to Condeco Automation, Incorporated, Novi, Mich., a corporation of Michigan
Filed Apr. 19, 1965, Ser. No. 449,106
7 Claims. (Cl. 193—25)

This invention relates to gravity conveyors and more particularly to flexible chuting adapted for field erection in straight or curved sections as required.

Prior conveyors of this type have been disclosed in U.S. Patent No. 2,815,841 granted Dec. 10, 1957 to Michael Dabich, in my copending application, Ser. No. 282,001 filed May 21, 1963, now abandoned, and in my copending application, Ser. No. 319,209, filed Oct. 28, 1963, now abandoned, in each of which carrier rails and side rails are formed from flat strip stock with the rails assembled in spaced generally parallel relationship with each other by transversely disposed spacers supported upon nut and bolt assemblies which project through openings in the rails and clamp the parts in their assembled position. Elongated slots in the carrier rails and at least one of the side rails accommodate variations in the relative length of the rail elements extending through curved sections faclitating field erection and assembly.

In each of such prior conveyors the carrier rails employed edge surfaces of the flat strip stock for engaging rolling surfaces of parts conveyed by gravity thus limiting potential applications to cylindrical or rotatable parts or relatively steeply inclined track sections where frictional sliding of the part rather than rolling is involved. In either case problems and limitations inherently arise in controlling the speed of conveyance due to the tendency of rolling parts to continue to accelerate up to excessive speeds as well as irregularities in and differences between static and sliding friction in cases where parts slide rather than roll.

The use of intermediate carrier rails also involves inherent steps of assembly including the insertion of spacer tubes between adjacent rails as an assembly bolt is progressively fed through side and carrier rails. In order to facilitate such assembly the constructions of my aforementioned prior applications were directed to the integral formation in one of the side rails of bolt holes with resilient securing ears upset from the rails at opposite sides inclined from their base outwardly from the general plane of the rail, as in the earlier application, or a single ear or tab offset at one side of the bolt hole and twisted to the helix angle of the bolt thread, as in the later application, in each case directed to the elimination of separate nut and lock washer requirements in completing the bolting assembly operations.

While such "Tinnerman" type integral nut and lock washer substitute constructions are common in sheet metal assemblies, the requirement for pre-tempered strip stock to provide flexible spring properties in the chuting employed herein has rendered the provision of integral thread engaging apertures a persistently difficult problem due to tendencies of the pre-tempered spring material to break or crack when stressed beyond the relatively high elastic limit as required to deform the helically angled bolt engaging tab portions during fabrication or where further stressed during assembly operations.

The present invention is directed primarily to provide an improved conveyor chuting construction which will overcome these and other problems and limitations and facilitate fabrication and assembly.

One object is to provide an improved construction wherein a single integral nut thread is formed at each bolt apertured in pre-tempered side rail strip stock which will engage substantially the full 360 degree corresponding thread of a bolt passing therethrough.

Another object is to provide ball bearing rollers in lieu of the previous carrier rails which can be pre-assembled and located directly on the inner surface of the respective side rails and serve to control the rate of part travel as well as to accommodate conveyance of parts having flat surfaces on gradual inclines.

Other objects and features of the invention will become apparent by reference to the following specification and to the drawings.

Figure 2:
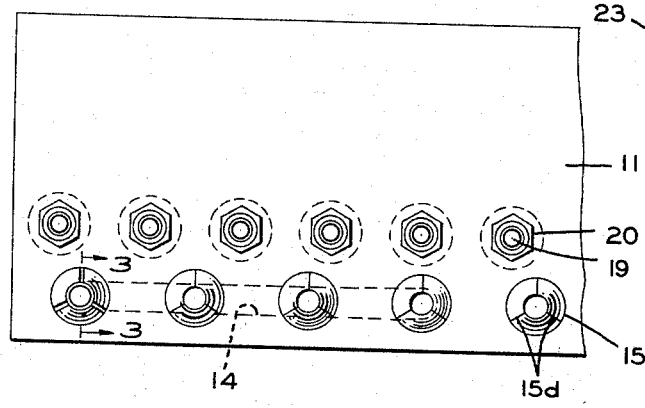
Figure 3:
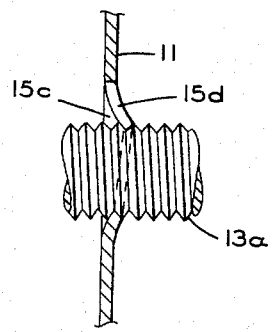
Figure 4:
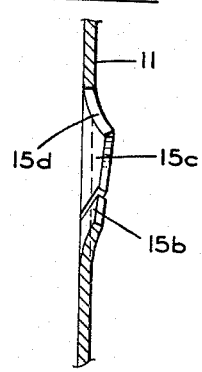
Figure 5:
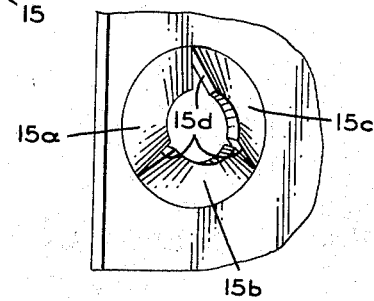

In the drawings:
FIG. 1 is an end elevation of a section of the assembled conveyor chuting;
FIG. 2 is a side elevation thereof;
FIG. 3 is an enlarged sectional view through one of the bolt holes showing the improved integral thread construction in association with a bolt extending therethrough;
FIG. 4 is a view similar to FIG. 3 with the bolt omitted;
FIG. 5 is a perspective view of such bolt hole showing more clearly the helical angle of the single thread; and
FIG. 6 is a sectional view through one of the ball bearing rollers employed for part carriage.

With reference to FIGS. 1 and 2 the present chuting construction comprises a pair of side rails 10, 11 made of pre-tempered spring steel strip stock, a spacer tube 12, a bolt 13 extending through a slot 14 in the side rail 10, the spacer tube 12 and side rail 11, the threaded end 13a of the bolt engaging a thread-apertured bolt hole 15 which upon tightening draws the head of the bolt 13 and washer 13b against the side rail 10 clamping the side rails 10 and 11 against the spacer tube 12 and upon further tightening drawing tri-segments 15a, 15b and 15c, best shown in FIG. 5, axially inwardly toward the spacer tube 12 and radially inwardly toward the threaded bolt end 13a to lock the assembly in vibration-proof condition. As shown most clearly in FIG. 5, three radial slits 15d spaced 120° apart extend to the full root of the deformed thread portion to permit each of the three thread segments 15a, 15b, 15c to be formed independently to the laterally projecting position shown without exceeding the tensile strength of the material as would otherwise result if the same helical thread deformation were attempted with a single slit or two diametrically opposed slits. The full helical thread engagement has proved far stronger and dependable in practice than either of the previous comparable constructions of my earlier co-pending applications and the problem of breaking or cracking during forming or assembly has been substantially eliminated.

Figure 6:
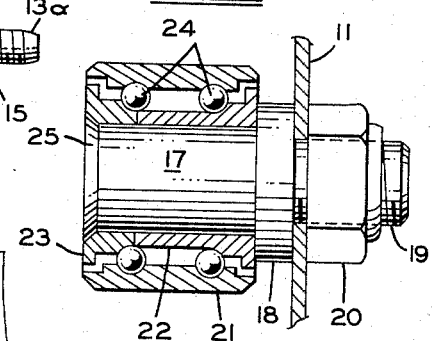

The ball bearing roller 16 best shown in FIG. 6 comprises a stem 17 having an integral spacer collar 18 attached to the side rail 11 by a threaded end 19 and lock nut 20. An outer race 21 is formed internally with a pair of ball grooves and assembled to a pair of axially abutting inner races 22, 23 with two full rows of bearing balls interposed therebetween. The ball bearing is fully pre-assembled on the stem 17 which is swaged over at the end 25 to complete the bearing assembly.

It will be understood that the rollers 16 spaced longitudinally as required to support a flat surface of the particular parts to be handled (pistons in the illustration of FIG. 1) serve to limit the speed of travel of such parts due to the inertia of the individual outer roller races and balls which must be accelerated as each part progresses while at the same time offering minimal resistance to start up from a static condition.

It will also be understood that the rollers 16 can be preassembled to the side rail strip stock at the fabrication plant or before delivery to the erection site thereby in cooperation with the elimination of carrier rails and extra spacer tubes associated therewith as well as the elimination of separate assembly nuts, minimizing assembly operations involved in on-site field erections.

While a particular prefered embodiment of the impoved chuting construction has been illustrated and described above it will be understood that numerous modifications might be resorted to without departing from the scope of the invention as defined in the following claims.

I claim:

1. In a gravity chute conveyor of the class wherein flexible pretempered spring metal strip side rails are joined at installation by spacer bolts defining an enclosed chute path and wherein each of said side rails is provided with inwardly extending antifriction rollers located above the level of said connecting spacer bolts adapted to supportingly engage parts conveyed on said chute; the combination of an antifriction roller construction comprising a shouldered stem, a two-piece inner case, bearings balls and an outer race, said stem extending through and being adapted to retain said two-piece inner race in assembled relation.

2. The contsruction of claim 1 wherein said stem is swaged at its end to retain said two-piece inner race in assembled relation.

3. In a gravity chute conveyor of the class wherein flexible pretempered spring metal strip side rails are joined at installation by spacer bolts defining an enclosed chute path and wherein each of said side rails is provided with inwardly extending antifriction rollers located above the level of said connecting spacer bolts adapted to supportingly engage parts conveyed on said chute; the combination of an antifriction roller construction comprising a shouldered stem, a two-piece inner case, bearing balls and an outer race, said stem extending through and being adapted to retain said two-piece inner race in assembled relation, said outer race having ball grooves, and said inner race having ball retaining shoulders.

4. The structure as defined in claim 1, one of said side rails having a plurality of helical thread apertures formed therein each adapted for engagement by a threaded bolt, each thread aperture being formed with a progressively outwardly helically offset perimeter, at least three radially extending slits dividing the thread aperture wall into independently formable segments, one of said slits extending between adjacent portions of the thread aperture wall spaced axially at the aperture perimeter a distance corresponding to the pitch of a single thread, each of said segments having a wedge shaped configuration capable of the required progressive helically offset forming sufficiently beyond the elastic limit of the pretempered spring material to allow for spring back without exceeding its ultimate strength.

5. A gravity chute conveyor construction as set forth in claim 4 wherein said slits extend substantially to the root of the outwardly deformed thread aperture wall.

6. A gravity chute conveyor construction as set forth in claim 4 wherein three slits are employed in each thread aperture wall.

7. A gravity chute conveyor construtcion as set forth in claim 4 wherein three equally spaced slits are employed in each thread aperture wall.

References Cited
UNITED STATES PATENTS

| | | | |
|---|---|---|---|
| 1,599,139 | 9/1926 | Marshall | 24—217 X |
| 2,246,022 | 6/1941 | Tinnerman | 29—532 |
| 2,815,841 | 12/1957 | Dabich | 193—25 |
| 2,948,375 | 8/1960 | Dabich | 193—35 |
| 3,037,603 | 6/1962 | Kornylak | 193—37 |
| 3,044,165 | 7/1962 | Munse | 85—32 X |

ANDRES H. NIELSEN, *Primary Examiner.*

EVON C. BLUNK, *Examiner.*

A. L. LEVINE, *Assistant Examiner.*